US008688921B2

(12) United States Patent
Levanoni (10) Patent No.: US 8,688,921 B2
(45) Date of Patent: Apr. 1, 2014

(54) STM WITH MULTIPLE GLOBAL VERSION COUNTERS

(75) Inventor: Yosseff Levanoni, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 987 days.

(21) Appl. No.: 12/396,560

(22) Filed: Mar. 3, 2009

(65) Prior Publication Data

US 2010/0228927 A1  Sep. 9, 2010

(51) Int. Cl.
*G06F 12/00* (2006.01)

(52) U.S. Cl.
USPC ..... 711/150; 711/141; 711/168; 711/E12.026

(58) Field of Classification Search
USPC .......................... 711/118, 147, 156, 150, 168
See application file for complete search history.

(56) References Cited

U.S. PATENT DOCUMENTS

| | | | |
|---|---|---|---|
| 7,328,316 B2 | 2/2008 | Moir et al. | |
| 7,395,382 B1 | 7/2008 | Moir | |
| 8,544,014 B2 * | 9/2013 | Gopalan et al. | 718/103 |
| 2007/0028056 A1 | 2/2007 | Harris | |
| 2007/0169030 A1 | 7/2007 | Tarditi et al. | |
| 2007/0198519 A1* | 8/2007 | Dice et al. | 707/8 |
| 2007/0239943 A1* | 10/2007 | Dice et al. | 711/147 |
| 2008/0022054 A1 | 1/2008 | Hertzberg et al. | |
| 2009/0172306 A1* | 7/2009 | Nussbaum et al. | 711/154 |
| 2010/0211931 A1* | 8/2010 | Levanoni et al. | 717/122 |
| 2011/0161603 A1* | 6/2011 | Taillefer | 711/150 |

OTHER PUBLICATIONS

Herlihy, et al., "Software Transactional Memory for Dynamic Sized Data Structures", retrieved at <<http://www.cs.rice.edu/~wns1/papers/2003-PODC-DSTM.pdf>>, Jul. 13-16, 2003, Boston, Massachusetts, pp. 10.
Spear, et al., "Conflict Detection and Validation Strategies for Software Transactional Memory", retrieved at <<http://www.cs.rochester.edu/u/scott/papers/2006_DISC_conflict.pdf>>, In Proc. of the 20th Intl. Symp. on Distributed Computing, pp. 15.
Harris, et al., "Transactional Memory: An Overview", retrieved at <<http://intl.ieeexplore.ieee.org/iel5/40/4292046/04292053.pdf?tp=&isnumber=&arnumber=4292053>>, IEEE Computer Society, 2007, pp. 22.
Riegel, et al., "Time-Based Transactional Memory with Scalable Time Bases", retrieved at <<http://wwwse.inf.tu-dresden.de/papers/preprint-riegel2007Isart.pdf>>, Proceedings of the nineteenth annual ACM symposium on Parallel algorithms and architectures , Jun. 9-11, 2007, pp. 9.
Dice, et al., "Transactional Locking II", retrieved at <<http://research.sun.com/scalable/pubs/DISC2006.pdf>>, pp. 15.

(Continued)

Primary Examiner — Edward Dudek, Jr.
Assistant Examiner — Sean D Rossiter (57) ABSTRACT

A software transactional memory system is provided with multiple global version counters. The system assigns an affinity to one of the global version counters for each thread that executes transactions. Each thread maintains a local copy of the global version counters for use in validating read accesses of transactions. Each thread uses a corresponding affinitized global version counter to store version numbers of write accesses of executed transactions. The system adaptively changes the affinities of threads when data conflict or global version counter conflict is detected between threads.

20 Claims, 9 Drawing Sheets

(56) References Cited

OTHER PUBLICATIONS

Menon, et al., "Practical Weak-Atomicity Semantics for Java STM", retrieved at <<http://delivery.acm.org/10.1145/1380000/1378588/p314-menon.pdf?key1=1378588&key2=7622397121&coll=GUIDE&dl=GUIDE&CFID=39460839&CFTOKEN=71933308>>, Jun. 14-16, 2008, Munich, Germany, pp. 314-325.

Abadi, et al., "Semantics of Transactional Memory and Automatic Mutual Exclusion", retrieved at <<http://research.microsoft.com/~tharris/papers/2008-popl.pdf>>, Jan. 7-12, 2007, San Francisco, California, pp. 12.

Herlihy, et al., "Scalable Concurrent Counting", ACM Transactions on Computer Systems, 13:4 (1995), pp. 343-364.

* cited by examiner

PRIOR TO MEMORY ACCESSES

Fig. 4B
SUBSEQUENT TO MEMORY ACCESSES

STM WITH MULTIPLE GLOBAL VERSION COUNTERS

BACKGROUND

Computer programs may be written to allow different portions (e.g., threads) of the program to be executed concurrently. In order to execute different portions of the program concurrently, the computer system or the program typically includes some mechanism to manage the memory accesses of the different portions to ensure that the portions access common memory locations in the desired order.

Transactional memory systems allow programmers to designate transactions in a program that may be executed as if the transactions are executing in isolation (i.e., independently of other transactions and other sequences of instructions in the program). Transactional memory systems manage the memory accesses of transactions by executing the transactions in such a way that the effects of a transaction may be rolled back or undone if two or more transactions attempt to access the same memory location in a conflicting manner. Transactional memory systems may be implemented using hardware and/or software components.

Many software transactional memory (STM) systems allow programmers to include both transactional and non-transactional code in their programs. In order to be practically efficient and pay-for-play, STM systems may provide weak atomicity where no general guarantee is made for interaction between transactional and non-transactional code. However, some commonly used code idioms, such as forms of publication, may behave incorrectly in STM systems with weak atomicity if publication safety is not provided. Unfortunately, the provision of publication safety in some STM systems may limit scalability or fail to preserve parallelism.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A software transactional memory system is provided with multiple global version counters. The system assigns an affinity to one of the global version counters for each thread that executes transactions. Each thread maintains a local copy of the global version counters for use in validating read accesses of transactions. Each thread uses a corresponding affinitized global version counter to store version numbers of write accesses of executed transactions. The system adaptively changes the affinities of threads when data conflict or global version counter conflict is detected between threads.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
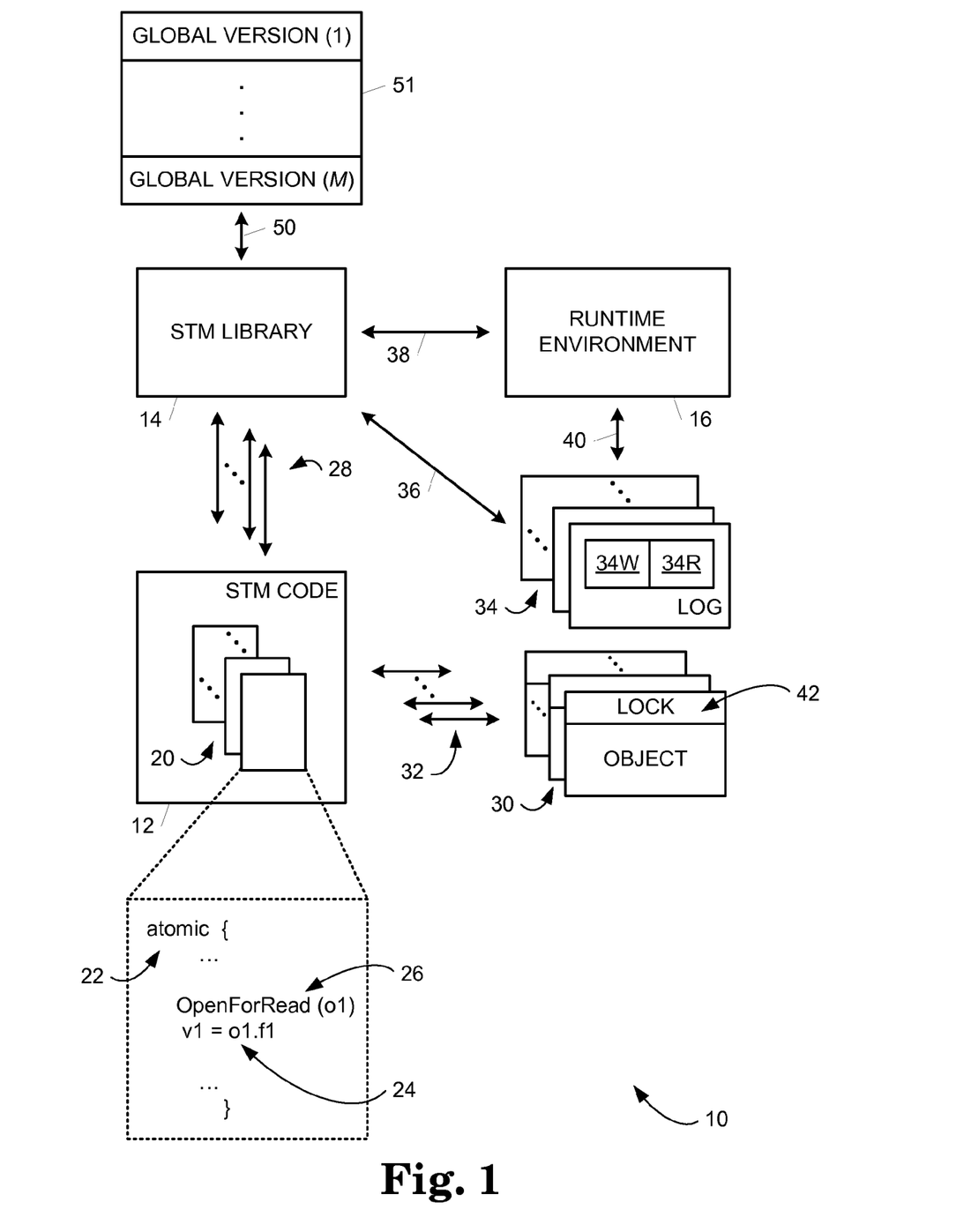
FIG. 1 is a block diagram illustrating an embodiment of a software transactional memory system.

FIG. 1 is a block diagram illustrating an embodiment of a software transactional memory (STM) system 10. STM system 10 represents a runtime mode of operation in a computer system, such as computer system 200 shown in FIG. 6 and described in additional detail below, where the computer system is executing instructions to run STM code 12.

STM system 10 includes STM code 12, an STM library 14, and a runtime environment 16. STM system 10 is configured to manage the execution of STM transactions 20 that form atomic blocks in STM code 12 to allow transactions 20 to be executed atomically and, if desired, to rollback or undo changes made by transactions 20. To do so, STM system 10 tracks memory accesses by transactions 20 to objects 30 using a log 34 for each executing transaction 20.

STM code 12 includes a set of one or more transactions 20. Each transaction 20 includes a sequence of instructions that is designed to execute atomically, i.e., as if the sequence is executing in isolation from other transactions 20 in STM code 12. Each transaction 20 includes an atomic block designator 22 that indicates that a corresponding portion of STM code 12 is a transaction 20. Each transaction 20 also includes zero or more memory accesses 24 that read from and/or write to one or more objects 30 as indicated by arrows 32. Transactions 20 also include invocations 26 of STM primitives, which may be added by a compiler such as a compiler 122 shown in FIGS. 5 and 6 and described in additional detail below, that call functions in STM library 14. The STM primitives of STM library 14 return results to transactions 20 as indicated by function calls and returns 28.

STM library 14 includes STM primitives and instructions executable by the computer system in conjunction with runtime environment 16 to implement STM system 10. The STM primitives of STM library 14 that are callable by transactions 20 include management primitives that implement start, commit, and abort functions in STM library 14. A transaction 20 calls the start function to initiate the management of the transaction 20 by STM library 14. A transaction 20 calls the commit function to finalize the results of the transaction 20 in memory system 204, if successful. A transaction 20 calls the abort function to roll back or undo the results of the transaction 20 in memory system 204.

The STM primitives of STM library 14 that are callable by transactions 20 also include memory access primitives that manage accesses to objects 30 that are written and/or read by a transaction 20. The memory access primitives access a set of one or more transactional locks 42 for each object 30. In one embodiment, STM system 10 uses the object header of objects 30 to store the corresponding transactional locks 42. Each transactional lock 42 indicates whether a corresponding object 30 or portion of a corresponding object 30 is locked or unlocked for writing and/or reading. When an object 30 is locked for writing, the corresponding transactional lock 42 includes an address or other reference that locates an entry for the object 30 in a write log 34W in one embodiment. When an object 30 is locked for reading (i.e., in response to a pessimistic read access), the corresponding transactional lock 42 includes a version number of the object 30, an index that identifies one of a vector of global version counters 51 (described below), and a pessimistic read counter (e.g., to allow multiple concurrent read accesses to the object 30). When an object 30 is not locked for writing or reading, the corresponding transactional lock 42 includes a version number (shown as version number 42A in FIGS. 3A, 4A, and 4B) of the object 30 and an index (shown as index 42B in FIGS. 3A, 4A, and 4B) that identifies one of a vector of global version counters 51 in this embodiment.

For each non-array object 30, the memory access primitives may access a single transactional lock 42 that locks or unlocks the non-array object 30 for writing and/or reading. For each array object 30, the memory access primitives may access a set of one or more transactional lock 42 where each transactional lock 42 in the set locks or unlocks a corresponding portion of the array object 30 for writing and/or reading. Runtime environment 16 creates and manages the transactional lock(s) 42 for each object 30. In other embodiments, separate transactional locks 42 may be used for different portions of objects 30.

The memory access primitives of STM library 14 generate and manage a set of one or more STM logs 34 for each transaction currently being executed. Each set of STM logs 34 includes a write log 34W and a read log 34R in one embodiment. Each write log 34W includes an entry for each object 30 that is written by a transaction 20 where each entry includes an address of a corresponding object 30, the version number from the transactional lock 42 of the corresponding object 30, an index that identifies one of a vector of global version counters 51, and an address or other reference that locates a shadow copy of the corresponding object 30. Each read log 34R includes an entry for each object 30 that is read by a transaction 20 where each entry includes a reference that locates the transactional lock 42 of a corresponding object 30.

Runtime environment 16 may be any suitable combination of runtime libraries, a virtual machine (VM), an operating system (OS) functions, such as functions provided by an OS 222 shown in FIG. 6 and described in additional detail below, and/or compiler functions, such as functions provided by compiler 122 shown in FIGS. 5 and 6 and described in additional detail below.

In one embodiment, STM system 10 provides weak atomicity between transactional code (i.e., transactions 20) and non-transactional code in STM code 12 and performs locking and conflict management of objects 30 at an object granularity for non-array objects 30 or at a portion of an object granularity for array objects 30. With weak atomicity, STM system 10 does not provide any general guarantees for interactions between transactional and non-transactional code when STM code 12 is executed. In other embodiments, STM system 10 may provide other types of atomicity and performs locking and conflict management of memory locations using another granularity.

STM system 10 generates and manages a vector or other set of M global version counters (VGV) 51, where M is greater than or equal to two, as indicated by an arrow 50. Each global version counter (GV) 51(1)-51(M) is used to provide a corresponding global version number to transactions 20 executed by affinitized threads 60 (shown in FIG. 2) where each thread 60 is affinitized to one of GV 51(1)-51(M). Each GV 51(1)-51(M) represents a time-stamp of a corresponding transaction 20 that was most recently completed by an affinitized thread 60. Each GV 51(1)-51(M) may be initialized to zero or other known values and is incremented as part of the commit process of transactions 20 executed by affinitized threads 60.

In one embodiment, GVs 51(1)-51(M) form an array with a fixed size. The fixed size may be selected to contain no less than one GV 51 for each possible concurrent executing transaction 20 (excluding any transactions 20 that are waiting to retry). In other embodiments, GVs 51(1)-51(M) form an array with a variable size. The variable size may be continuously or periodically adjusted to contain no less than one GV 51 for each possible concurrent executing transaction 20 (excluding any transactions 20 that are waiting to retry).

STM system 10 uses GVs 51(1)-51(M) to implement global versioning for transactions 20 as described in additional detail below with reference to the embodiments of FIGS. 3A-3B and 4A-4C. With global versioning, STM system 10 may guarantee that a given transaction 20 can detect conflicting writes by other transactions 20 that commit after the given transaction 20 starts. As a result, STM system 10 uses the global versioning from GVs 51(1)-51(M) to ensure publication safety.

Figure 2:
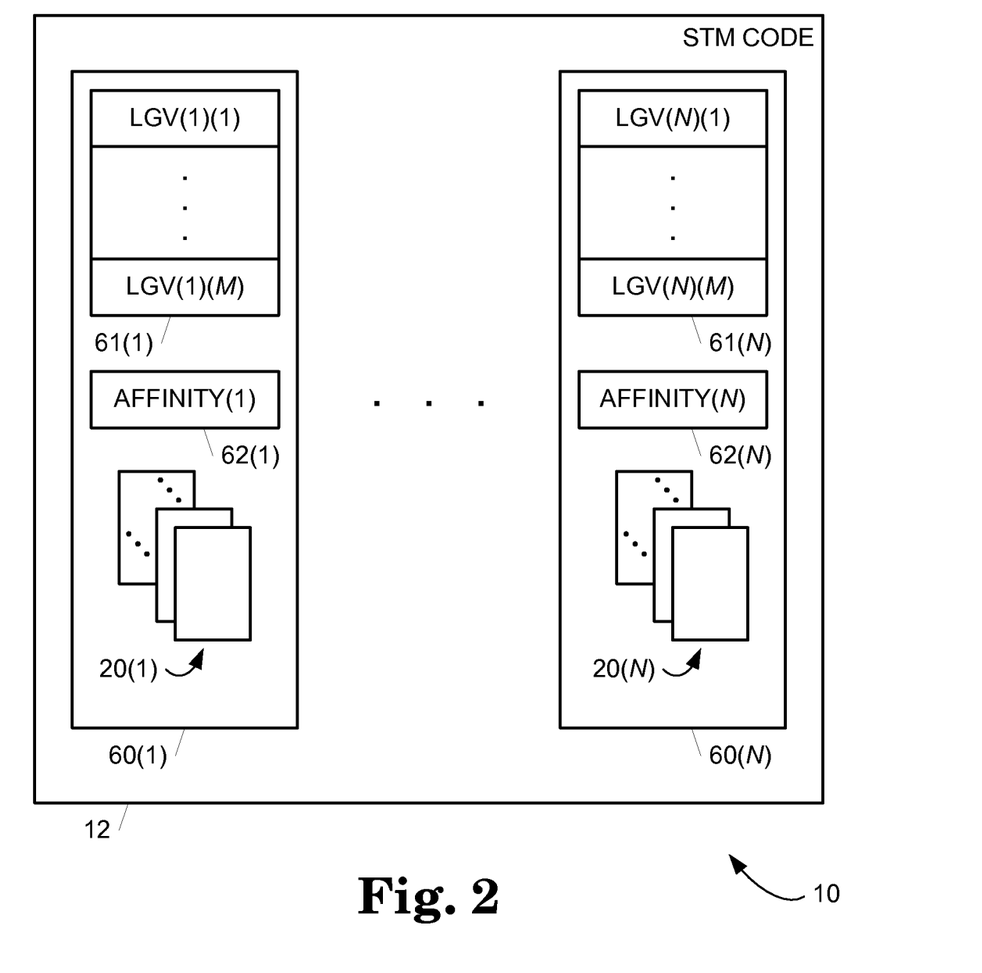
FIG. 2 is a block diagram illustrating an embodiment of software transactional memory code in a software transactional memory system.

FIG. 2 is a block diagram illustrating an embodiment of STM code 12 executing in STM system 10. In the embodiment of FIG. 2, STM code 12 executes N threads 60(1)-60(N) where N is an integer that is greater than or equal to two. Each thread 60(1)-60(N), over the duration of the thread 60, executes a respective subset of one or more transactions 20(1)-20(N) along with any non-transactional code (not shown) and stores a respective local copy 61(1)-61(M) of the vector of GVs 51(1)-51(M). Each local copy 61 includes local global version counters (LGVs) (1)-(M) that correspond to GVs 51(1)-51(M). For example, local copy 61(1) of thread 60(1) includes LGVs (1)-(M) that correspond to GVs 51(1)-

51(M). Each thread 60 is assigned an affinity 62 to one of GVs 51(1)-51(M). Each affinity 62 identifies one of GVs 51(1)-51(M).

STM system 10 assigns affinities 62 to each thread 60. In one embodiment, STM system 10 operates to assign affinities 62 to cause threads 60 with transactions 20 that contend for data to have affinities 62 for the same one of GVs 51(1)-51(M) and cause threads 60 with transactions 20 that do not contend for data to have affinities 62 for different ones of GVs 51(1)-51(M). To do so, STM system 10 adaptively changes affinities 62 of threads 60 when contention on data or contention on GVs 51(1)-51(M) is detected between transactions 20 on two or more threads 60.

STM system 10 stores an index that identifies one of GVs 51(1)-51(M) along with each version number of an object 30 in transactional lock 42. STM system 10 also stores the index along with the version number in log 34W when an object 30 is written. STM system 10 uses both the indices and the version numbers to detect conflicts as described in additional detail below with reference to the embodiments of FIGS. 3A-3B and 4A-4C.

When STM system 10 detects a conflict with an object 30 for a transaction 20 executed by a thread 60 (i.e., data contention on the object 30 between the transaction 20 and another transaction 20 in another thread 60), STM system 10 changes the affinity 62 of the thread 60 executing the conflicting transaction 20 to be the same as the index of the GV 51 in the transactional lock 42 of the object 30 where the conflict occurred. As a result, the thread 60 with the conflict becomes affinitized to the one of GVs 51(1)-51(M) that corresponds to the index of the GV 51 in the transactional lock 42 of the object 30. By doing so, STM system 10 causes threads 60 with conflicting transactions 20 to converge on the same GV 51 to allow conflicts to be detected early.

When STM system 10 detects that threads 60 without conflicting transactions 20 have been affinitized to the same GV 51 (i.e., the threads 60 are contending on the same GV 51), STM system 10 changes the affinity 62 of one or more of the threads 60 to differ from the affinity or affinities 62 of the other thread or threads 60. In one embodiment, STM system 10 accesses an affinitized GV 51 for each transaction 20 executed by a thread 60 prior to and subsequent to performing any memory access for the transaction 20. If the value of the accessed GV 51 changes while a transaction 20 is performing memory accesses, then STM system 10 detects that another transaction 20 executed by another thread 60 has accessed the same GV 51 (i.e., the other thread 60 is affinitized to the same GV 51). If the transactions 20 do not conflict, then STM system 10 changes the affinity 62 of the thread 60 that detected different values of the accessed GV 51 to correspond to a different GV 51 to cause the affinity 62 to differ from the affinity 62 of the other thread 60. By doing so, STM system 10 may enhance parallelism by reducing contention on any given GV 51.

When changing the affinity 62 of thread 60 due to contention on a GV 51, STM system 10 may change the affinity 62 to an arbitrary GV 51 or a GV 51 with the least amount of contention. STM system 10 may track the amount of contention on each GV 51 by maintaining a reference counter (not shown) for each GV 51 that indicates how many threads 60 have been affinitized to the corresponding GV 51. STM system 10 may change the affinity 62 to the GV 51 with the least amount of contention indicated by the reference counters.

To reduce the amount of contention on GVs 51(1)-51(M), threads 60 update local copies 61 with updated versions of GVs 51 as follows in one embodiment. Each time a thread 60 starts a transaction 20, the thread 60 loads an updated version of its affinitized GV 51 into the corresponding LGV in the local copy 61 for the thread 60. The thread 60 loads the remaining GVs 51 into the corresponding LGVs in the local copy 61 only in response to a conflict being detected or in response the LGVs in the local copy 61 not being updated for a period. The period may be an amount of time, a number of transactions 20 executed by the thread 60, a number of transactions 20 executed collectively by all threads 60, or another suitable measure. In response to detecting a conflict or detecting that the LGVs in the local copy 61 have not been updated for a period for a thread 60, STM system 10 update the local copy 61 with updated versions of GVs 51 for the thread 60 prior to executing another transaction 20. In other embodiments, threads 60 update corresponding local copies 61 with updated versions of GVs 51 in other suitable ways.

Embodiments of algorithms that use multiple GVs 51 will now be described with reference to FIGS. 3A-3B and 4A-4C.

Figure 3A:
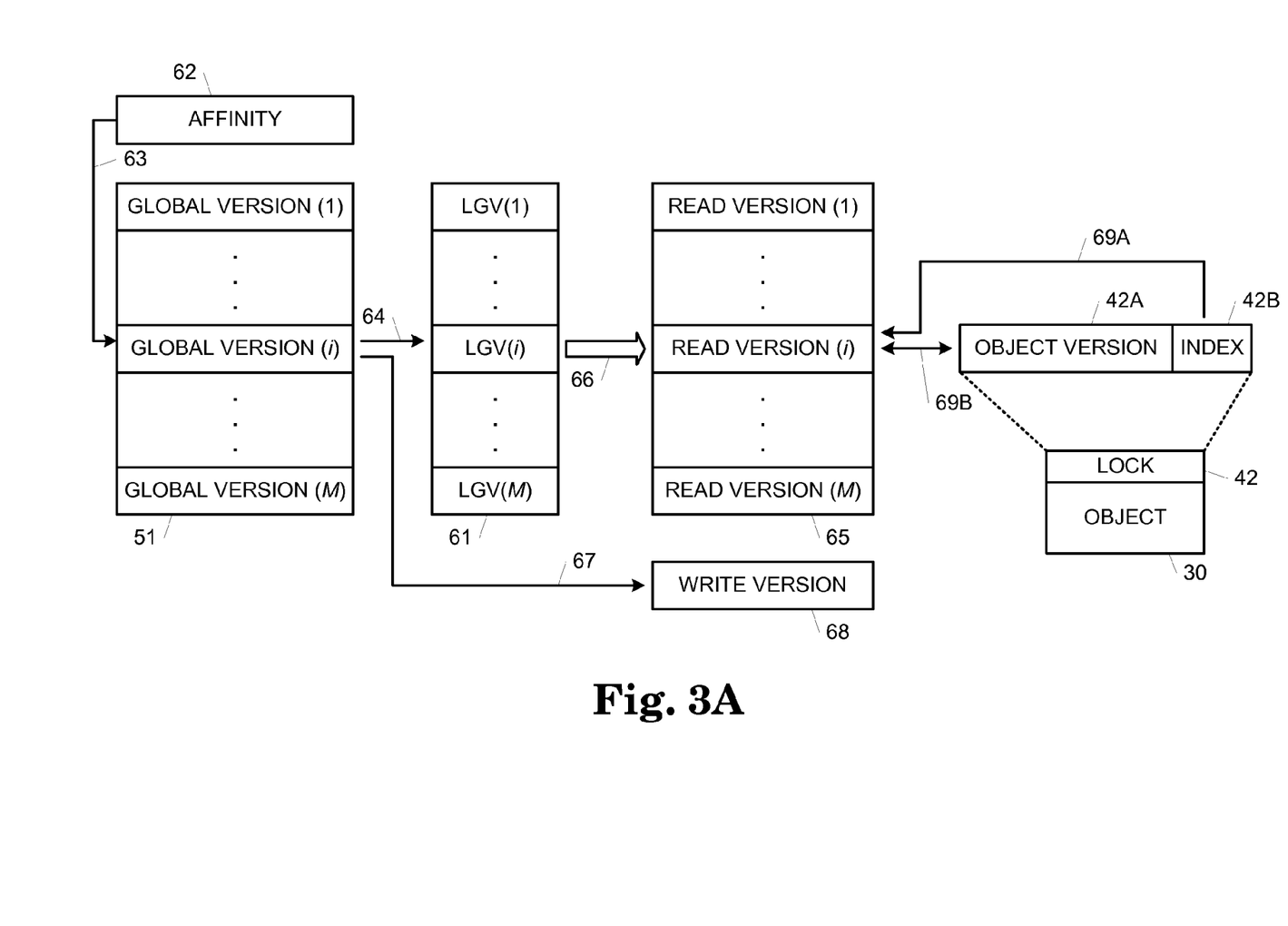
FIG. 3A is a block diagram illustrating an embodiment of transaction variables in a software transactional memory system.
Figure 3B:
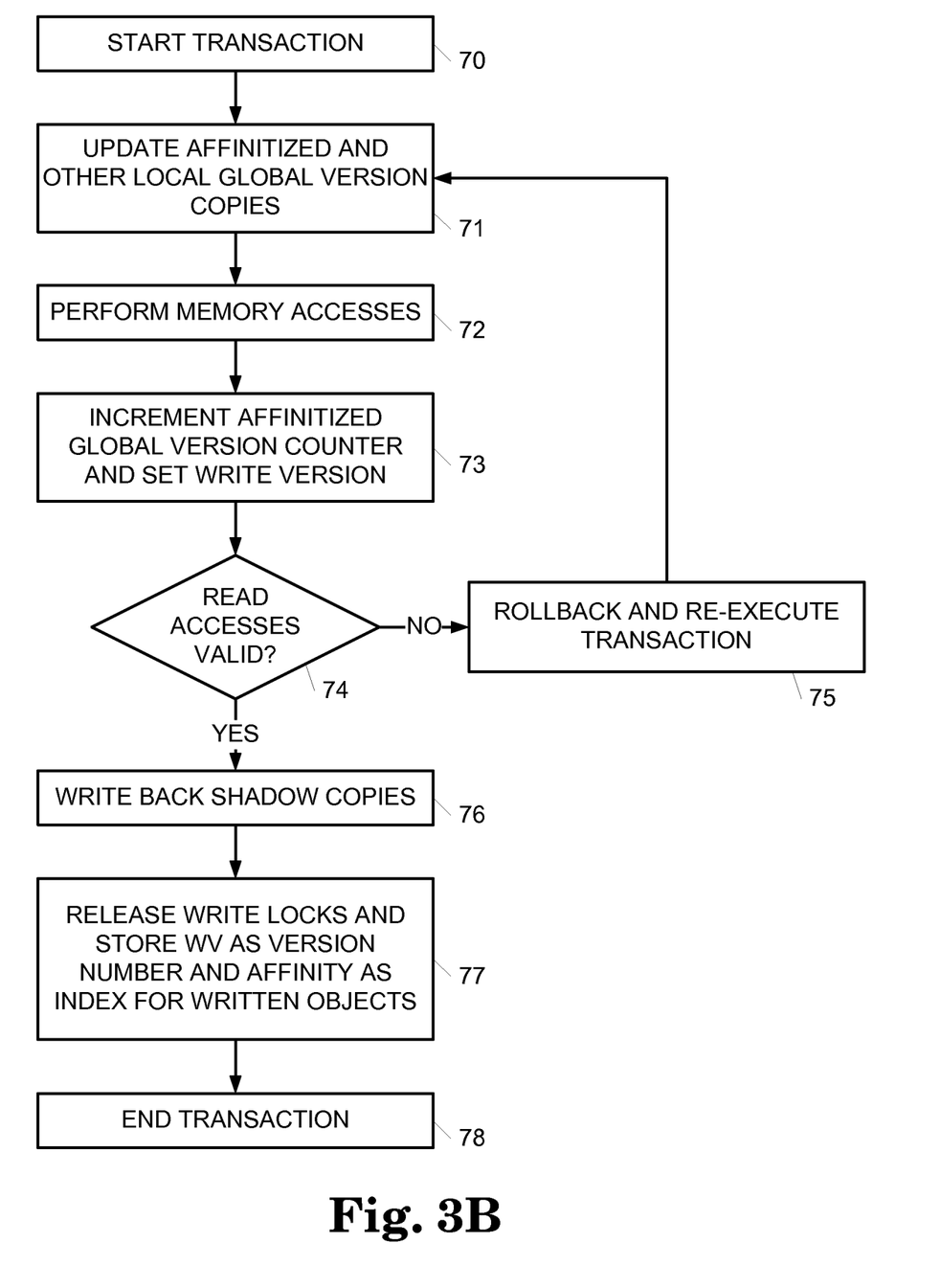
FIG. 3B is a flow chart illustrating an embodiment of a method for executing a transaction in a software transactional memory system.

FIG. 3A is a block diagram illustrating an embodiment of transaction variables in STM system 10, and FIG. 3B is a flow chart illustrating an embodiment of a method for executing a transaction 20 in STM system 10 using the transaction variables shown in FIG. 3A. STM system 10 performs the algorithm illustrated by the embodiment of FIGS. 3A-3B for each transaction 20 of each thread 60 in one embodiment.

As shown in FIG. 3A, STM system 10 stores a local copy 61 of GVs 51 for a thread 60 prior to execution of transactions 20. As indicated by affinity 62 and an arrow 63, thread 60 is affinitized to GV 51(i) where i is an integer that is between one and M inclusive and represents the ith GV 51.

Referring to both FIGS. 3A and 3B, a transaction 20 is started in STM system 10 as indicated in a block 70. When the transaction 20 starts, STM library 14 updates the affinitized LGV(i) in local copy 61 with GV 51(i) (indicated by an arrow 64 in FIG. 3A) and other LGVs in local copy 61, as needed, as indicated in a block 71 in FIG. 3B. STM library 14 may update other LGVs in local copy 61 if the LGVs have not been updated for a period as described above. STM library 14 stores the updated LGV(i) and the remaining LGVs in local copy 61 as a set of read versions (RVs) 65(1)-65(M) (indicated by an arrow 66 in FIG. 3A) prior to performing memory accesses of the transaction 20. STM library 14 then allows the transaction 20 to execute and perform any write and/or read memory accesses to objects 30 as indicated in a block 72.

To access an object 30 for writing, the transaction 20 invokes a memory access primitive that opens the object 30 for writing. STM library 14 acquires a transactional lock 42 corresponding to the object 30 for the transaction 20 if the lock is available. If the object 30 is not available (i.e., the object 30 is locked by another transaction 20), then STM library 14 detects a conflict between the current transaction 20 and the other transaction 20 and may rollback and re-execute the current transaction 20. If the object 30 is locked by the current transaction 20, then STM library 14 has already acquired the transactional lock 42 corresponding to the object 30 for the transaction 20. Once a corresponding transactional lock 42 is acquired, STM library 14 causes each write access 32 to be made to a shadow copy (not shown) of the corresponding object 30 and causes an entry corresponding to the write access 32 to be stored in log 34W.

To access an object 30 for reading, the transaction 20 invokes a memory access primitive that opens the object 30 for reading. If the object 30 is locked by another transaction 20, then STM library 14 detects a conflict between the current transaction 20 and the other transaction 20 and may rollback and re-execute the current transaction 20. If the object 30 is locked by the current transaction 20, then STM library 14 may cause an entry corresponding to the read access to be stored in read log 34R or set a flag corresponding to the object 30 in write log 34W to indicate that the object 30 was also read.

If the object 30 is not locked, then STM library 14 accesses a version number 42A and index 42B of the GV 51 of the object 30 from transactional lock 42 and compares the version number 42A to the RV 65 that corresponds to the index of the GV 51 of the object 30 as indicated by arrows 69A and 69B. If the version number 42A is greater than to the RV 65 that corresponds to the index 42B of the GV 51 of the object 30, then STM library 14 detects a conflict and may rollback and re-execute the current transaction 20. Otherwise, STM library 14 causes an entry corresponding to the read access to be stored in read log 34R. If the read access is a pessimistic read access, STM library 14 also acquires a transactional lock 42 for the object 30. STM library 14 causes a read access 32 that occurs before a designated object 30 has been opened from writing by the transaction 20 to be made directly from the corresponding object 30. STM library 14 causes each read access 32 that occurs after a designated object 30 has been opened for writing by a transaction 20 to be made from the corresponding shadow copy.

After all memory accesses have been performed but before validating read accesses, STM library 14 atomically increments the affinitized GV 51(i) and sets a write version (WV) 68 equal to the incremented value of 51(i) (indicated by an arrow 67 in FIG. 3A) as indicated in a block 73 in FIG. 3B. STM library 14 omits performing the function of block 73 for transactions 20 that do not include any write accesses (i.e., read-only transactions 20).

STM library 14 attempts to validate the read accesses of the transaction 20 using read versions 65 and log 34R as indicated in a block 74. In one embodiment, STM library 14 compares the current version number 42A in a corresponding transactional lock 42 for each object 30 identified in read log 34R to the RV 65 identified by the index 42B in the corresponding transactional lock 42 to validate read accesses as indicated by arrows 69A and 69B. If a current version number 42A is less than or equal to the corresponding RV 65, then the corresponding object 30 has not been changed since the current transaction 20 began and the read access is consistent. If a current version number 42A is greater than the corresponding RV 65, then STM library 14 determines that the corresponding read access is inconsistent. In this case, the current version number 42A of the corresponding object 30 was produced by a concurrent transaction 20. This embodiment assumes that GVs 51 do not exceed a maximum value that may be represented by each GV 51 (i.e., GVs 51 do not overflow). In other embodiments, STM library 14 may implement techniques described in co-pending U.S. patent application Ser. No. 12/370,742, filed on Feb. 13, 2009, and entitled STM WITH GLOBAL VERSION OVERFLOW HANDLING to validate read accesses in other suitable ways and handle or avoid overflow of GVs 51. This U.S. Patent Application is assigned to the assignee of the present invention and is hereby incorporated by reference herein.

If any of the read accesses are not consistent, then STM library 14 determines that a conflict may exist and the read accesses are invalid. If the read accesses are invalid, then STM library 14 rolls back and re-executes the current transaction 20 as indicated in block 75. To roll back transaction 20, STM library 14 uses log 34W to cause the shadow copies to be discarded and stores the version numbers and indices in log 34W as the version numbers 42A and indices 42B in transactional locks 42 of the corresponding objects 30. STM library 14 then repeats the functions of at least blocks 71 through 74 in re-executing the transaction 20.

If all of the read accesses are consistent, then STM library 14 writes back any shadow copies that were created by the transaction 20 to the corresponding objects 30 using log 34W as indicated in a block 76. In embodiments with field-level granularity and weak atomicity, STM library 14 may write back only those fields in the shadow copies that have been written by the transaction 20 to prevent a granular lost update problem from occurring. STM library 14 commits the transaction 20 by releasing all acquired transactional locks 42, and storing the value of WV 68 as the version number 42A and the affinity 62 of thread 60 as the index 42B of all objects 30 that are unlocked as indicated in a block 77. STM library 14 ends the transaction as indicated in a block 78.

Figure 4A:
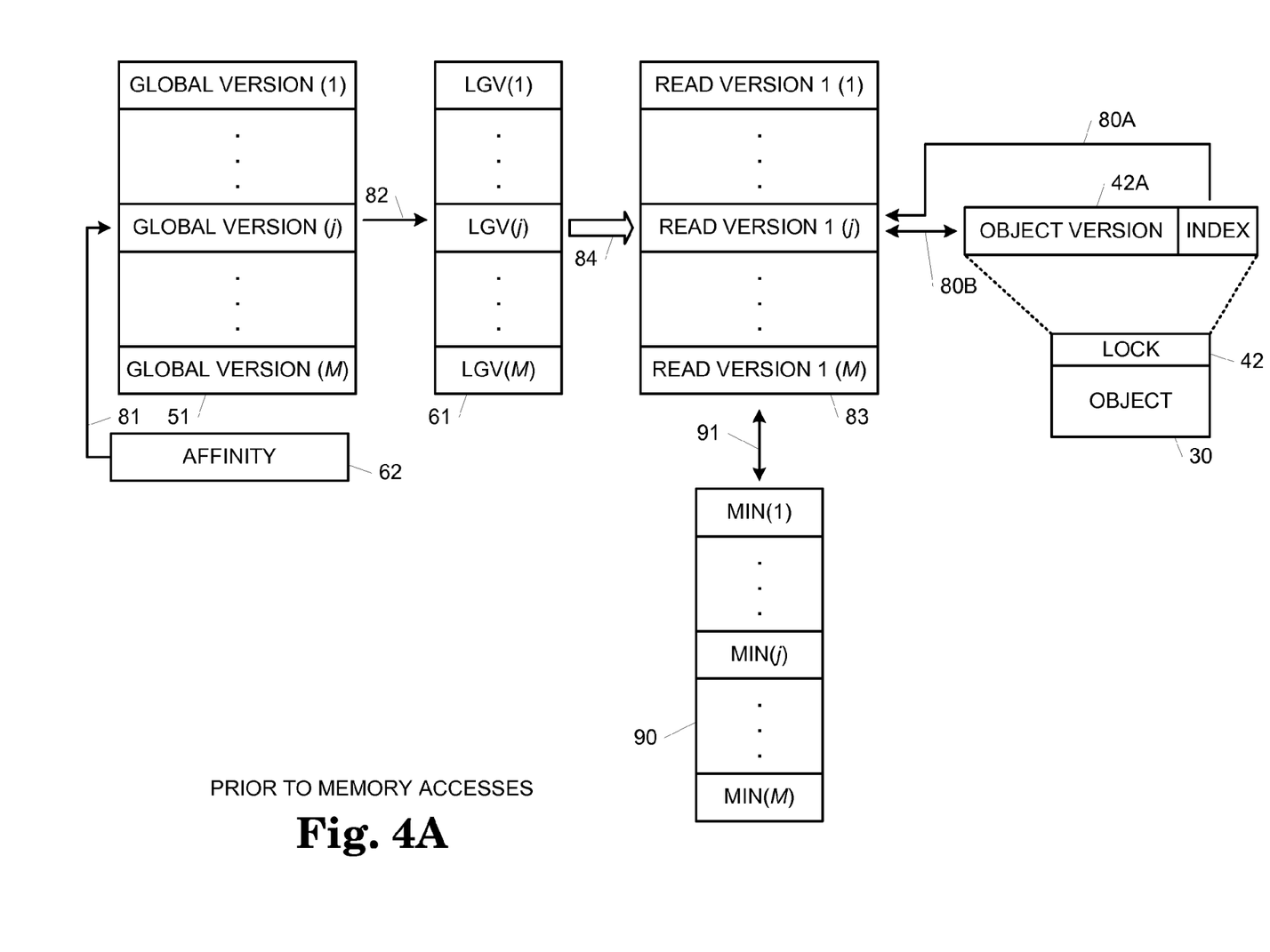
FIGS. 4A-4B are block diagrams illustrating an embodiment of transaction variables in an software transactional memory system.
Figure 4B:
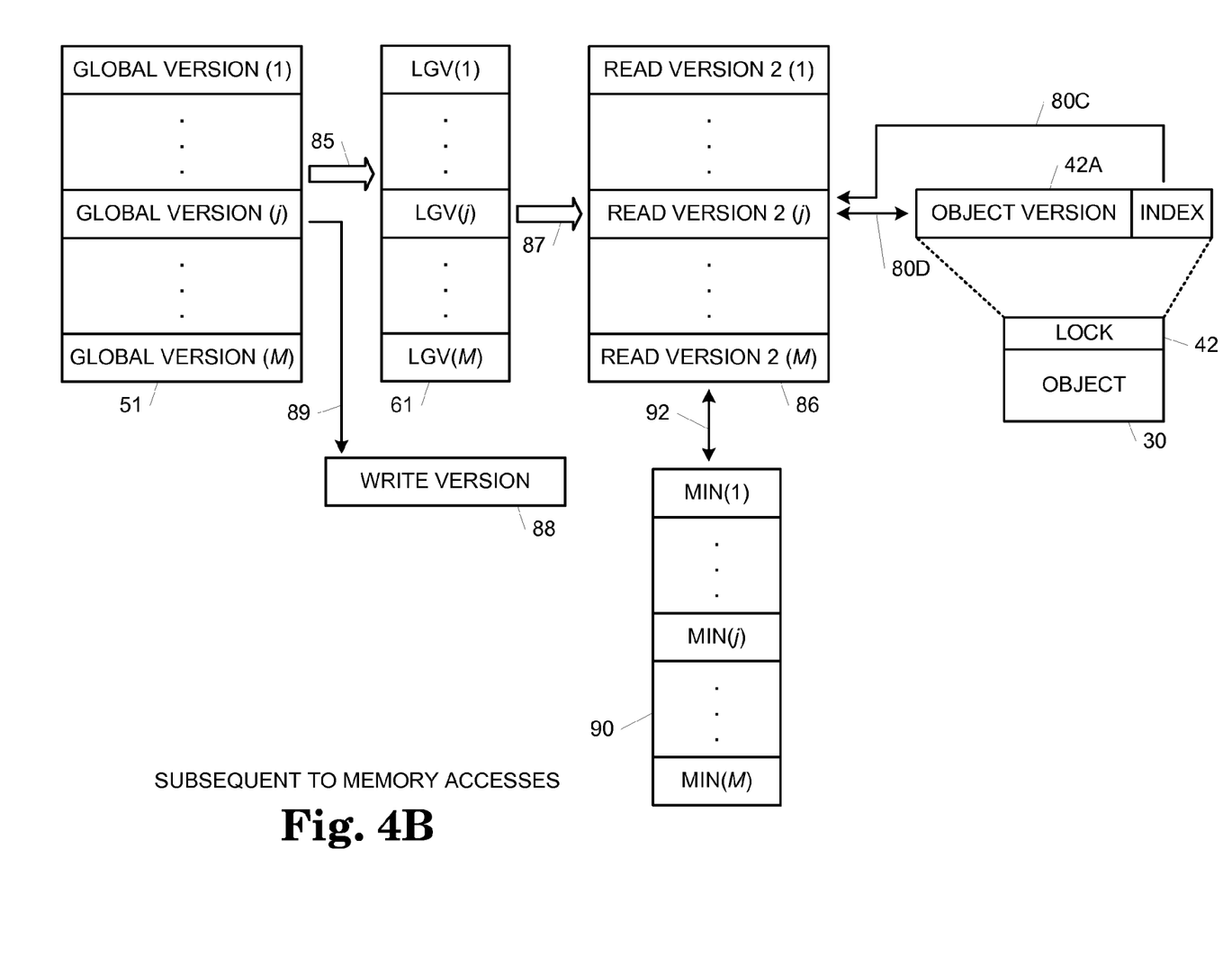
Figure 4C:
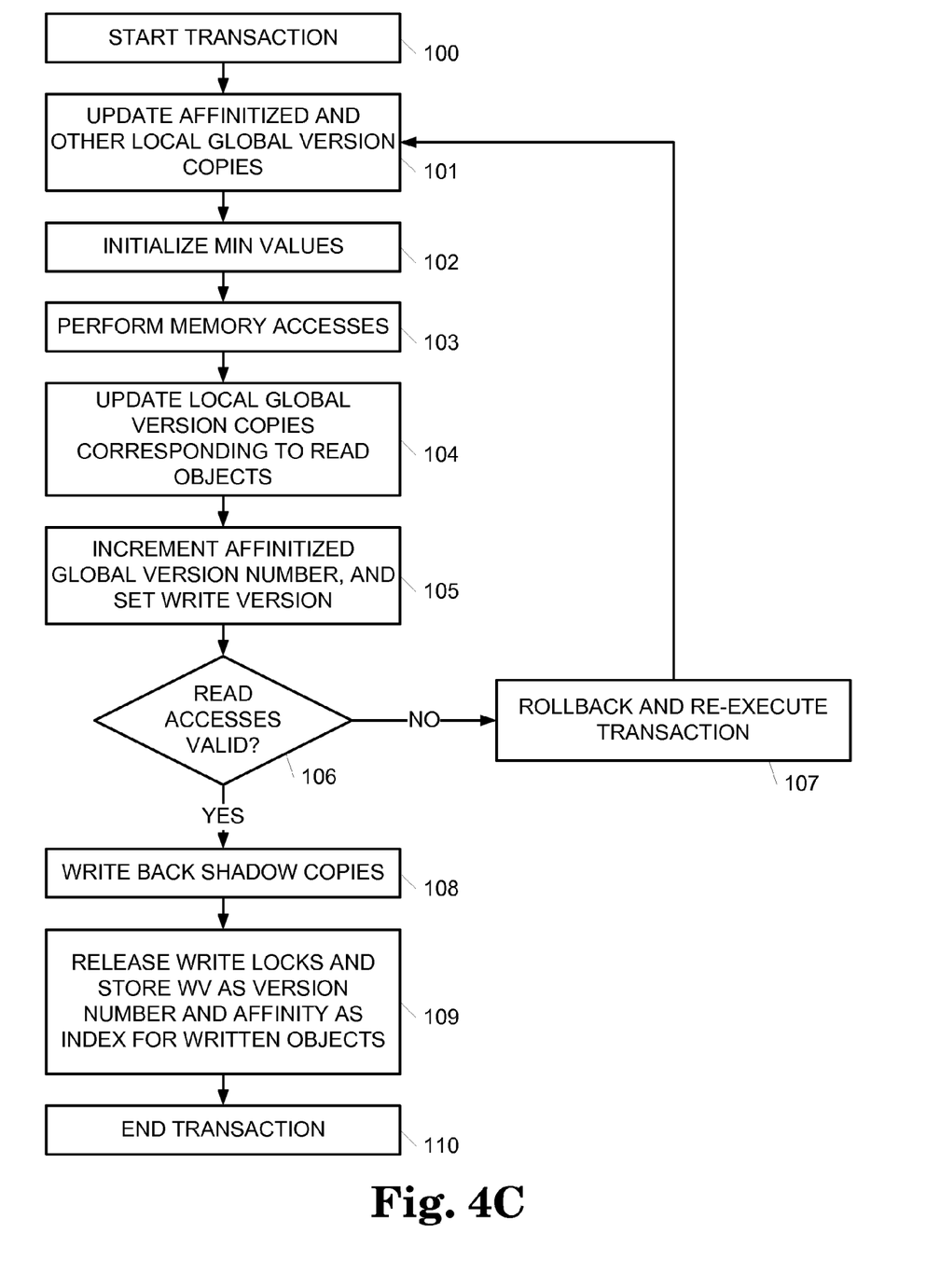
FIG. 4C is a flow chart illustrating an embodiment of a method for executing a transaction in a software transactional memory system.

FIGS. 4A-4B are block diagrams illustrating an embodiment of transaction variables in STM system 10, and FIG. 4C is a flow chart illustrating an embodiment of a method for executing a transaction 20 in STM system 10 using the transaction variables shown in FIGS. 4A-4B. STM system 10 performs the algorithm illustrated by the embodiment of FIGS. 4A-4C for each transaction 20 of each thread 60 in one embodiment.

As shown in FIG. 4A, STM system 10 stores a local copy 61 of GVs 51 for a thread 60 prior to execution of transactions 20. As indicated by affinity 62 and an arrow 81, thread 60 is affinitized to GV 51(j) where j is an integer that is between one and M inclusive and represents the jth GV 51.

Referring to FIGS. 4A-4C, a transaction 20 is started in STM system 10 as indicated in a block 100 in FIG. 4C. When the transaction 20 starts, STM library 14 updates affinitized LGV(j) in local copy 61 with GV 51(j) (indicated by an arrow 82 in FIG. 4A) and other LGVs in local copy 61, as needed, as indicated in a block 101 in FIG. 4C. STM library 14 may update other LGVs in local copy 61 if the LGVs have not been updated for a period as described above. STM library 14 stores the updated LGV(j) and the remaining LGVs in local copy 61 as a first set of read versions (RV1s) 83(1)-83(M) (indicated by an arrow 84 in FIG. 4A) prior to performing memory accesses of the transaction 20.

STM library 14 initializes the values of MIN 90 as indicated in a block 102. STM library 14 initially stores a maximum possible version number of all objects 30 as each MIN 90(1)-90(M).

STM library 14 allows the transaction 20 to execute and perform any write and/or read memory accesses to objects 30 as indicated in a block 103. Transaction 20 accesses objects 30 for reading and/or writing as described above with reference to the function of block 72 of FIG. 3B using RV1s 83. If an object 30 is not locked, then STM library 14 accesses a version number 42A and index 42B of the GV 51 of the object 30 from transactional lock 42 and compares the version number 42A to the RV1 83 that corresponds to the index of the GV 51 of the object 30 as indicated by arrows 80A and 80B. If the version number 42A is greater than to the RV1 83 that corresponds to the index 42B of the GV 51 of the object 30, then STM library 14 detects a conflict and may rollback and re-execute the current transaction 20. Otherwise, STM library 14 causes an entry corresponding to the read access to be stored in read log 34R. If the read access is a pessimistic read access, STM library 14 also acquires a transactional lock 42 for the object 30. STM library 14 causes a read access 32 that occurs before a designated object 30 has been opened from writing by the transaction 20 to be made directly from the corresponding object 30. STM library 14 causes each read access 32 that occurs after a designated object 30 has been opened for writing by a transaction 20 to be made from the corresponding shadow copy.

STM library 14 updates each MIN 90(1)-90(M) for pessimistic read accesses and read-after-write accesses (i.e., a read access to an object 30 that has already been accessed for writing by the same transaction 20) as indicated by an arrow 91 follows. For each read-after-write access, STM system 10 accesses the stored version number and index of the object 30 that is being read from log 34W and updates the MIN 90 that corresponds to the index to be equal to the stored version number of the object 30 if the stored version number is greater than RV1 83 and is less than the corresponding MIN 90. For each pessimistic read access that is not write locked or is write locked by the current transaction 20 or other transactions 20 in the same transaction nest as the current transaction 20, STM system 10 accesses the version number 42A and index 42B of the object 30 that is being read from transactional lock 42 and updates the MIN 90 that corresponds to the index 42B to be equal to the version number 42A from transactional lock 42 if the version number 42A from transactional lock 42 is greater than RV1 83 and is less than MIN 90.

In the embodiment of FIGS. 4A-4C, STM system 10 tracks a set of GVs 51 that corresponds to the set of read accesses of the transaction. STM system 10 notes the index 42B of the GV 51 in the transactional lock 42 of each object 30 read by the transaction to ensure that the local copies 61 that correspond to the indices 42B of read objects 30 are updated subsequent to performing the memory accesses.

In one embodiment, STM system 10 keeps a list of the local copies 61 that will be reloaded before validating the read accesses. STM system 10 populates the list upon reading the index 42B in a transactional lock 42 while transaction 20 executes. In order to accommodate a potentially large number of GVs 51, thread 60 maintains the following local variables:

```
int num_counters_to_load;
bool load_counter_flag[M];
int counters_to_load[M];
```

Upon reading the index 42B in a transactional lock 42 while transaction 20 executes, the following algorithm will be executed.

```
If load_counter_flag[counter id] is false, then
a.  Set load_counter_flag[counter id] := true;
b.  Set counters_to_load[num_counters_to_load] := counter_id;
    and
c.  Increment num_counters_to_load by one.
```

After all memory accesses have been performed but before validating read accesses, STM library 14 updates LGVs in local copy 61 that correspond to the indices of GVs 51 of objects 30 accessed for reading by transaction 20 (indicated by an arrow 85 in FIG. 4B) as indicated in a block 104 in FIG. 4C. STM library 14 stores the updated LGVs in local copy 61 as a second set of read versions (RV2s) 86(1)-86(M) (indicated by an arrow 87 in FIG. 4B) for use in validating the read accesses.

In embodiments with the above local variables, the following loop executes to reset the original variables to their original values before validating the read accesses.

```
for (int i=0; i< num_counters_to_load; i++)
{
    Load VRV2[i] from VGVN[i], applying overflow logic.
    Load_counter_flag[i] = false;
}
num_counters_to_load = 0;
```

Using the above algorithm in this embodiment, STM system 10 ensures that all relevant values referenced in RV2s 86 will have been loaded after the last memory access in transaction 20 and before validating the read accesses.

STM library 14 atomically increments the affinitized GV 51(j) and sets a write version (WV) 88 equal to the incremented value of 51(i) (indicated by an arrow 89 in FIG. 4B) as indicated in a block 105 in FIG. 4C. STM library 14 omits performing the function of block 105 for transactions 20 that do not include any write accesses (i.e., read-only transactions 20).

STM library 14 attempts to validate the read accesses of the transaction 20 using RV1s 83, RV2s 86, and log 34R as indicated in a block 106. In one embodiment, STM library 14 compares the current version number 42A in a corresponding transactional lock 42 for each object 30 identified in read log 34R to the RV1 83 and RV2 86 identified by the index 42B in the corresponding transactional lock 42 to validate optimistic read accesses as indicated by arrows 80A and 80B (FIG. 4A) and arrows 80C and 80D (FIG. 4B). If a current version number 42A is less than or equal to the corresponding RV1 83, then the corresponding object 30 has not been changed since the current transaction 20 began and the read access is consistent. If a current version number 42A is greater than the corresponding RV2 86 then the corresponding object 30 also has not been changed since the current transaction 20 began and the read access is consistent. If a current version number 42A is greater than the corresponding RV1 83 and less than or equal to the corresponding RV2 86, then STM library 14 determines that the read access is inconsistent. In this case, the current version number 42A of the corresponding object 30 may have been produced by a concurrent transaction 20.

To validate pessimistic read accesses and both optimistic and pessimistic read-after-write accesses, STM library 14 compares each RV2 86 loaded after the last memory access in transaction 20 to the corresponding MIN 90 as indicated by an arrow 92 in FIG. 4B. Each MIN 90 is updated during read accesses as described above. If any of the RV2s 86 loaded after the last memory access in transaction 20 is greater than a corresponding MIN 90, STM library 14 determines that at least one pessimistic read or read-after-write access is possibly inconsistent. If at least one pessimistic read or read-after-write access is possibly inconsistent, at least one object 30 associated with a pessimistic read or read-after-write access from the current transaction 20 may have been written by another transaction 20 after the current transaction 20 began but before the object 30 was locked pessimistically by the current transaction 20. Thus, at least one pessimistic read or read-after-write access was to an object 30 with a version number that was greater than a corresponding RV1 83 and less than or equal to a corresponding RV2 86. By using MINs 90, STM library 14 avoids validating each pessimistic read and read-after-write access in log 34R individually. In addition, STM library 14 may omit recording the version number of objects 30 for pessimistic read and read-after-write accesses in log 34R.

The above embodiment assumes that GVs 51 do not exceed a maximum value that may be represented by each GV 51

(i.e., GVs 51 do not overflow). In other embodiments, STM library 14 may implement techniques described in co-pending U.S. patent application Ser. No. 12/370,742, incorporated by reference above, to validate read accesses in other suitable ways and handle or avoid overflow of GVs 51.

If any of the read accesses are not consistent, then STM library 14 determines that a conflict may exist and the read accesses are invalid. If the read accesses are invalid, then STM library 14 rolls back and re-executes the current transaction 20 as indicated in block 107. To roll back transaction 20, STM library 14 uses log 34W to cause the shadow copies to be discarded and stores the version numbers and indices in log 34W as the version numbers 42A and indices 42B in transactional locks 42 of the corresponding objects 30. STM library 14 then repeats the functions of at least blocks 101 through 106 in re-executing the transaction 20.

If all of the read accesses are consistent, then STM library 14 writes back any shadow copies that were created by the transaction 20 to the corresponding objects 30 using log 34W as indicated in a block 108. In embodiments with object granularity and weak atomicity, STM library 14 may write back only those fields in the shadow copies that have been written by the transaction 20 to prevent a granular lost update problem from occurring. STM library 14 commits the transaction 20 by releasing all acquired transactional locks 42, and storing the value of WV 88 as the version number and the affinity 62 of thread 60 as the index of all objects 30 that are unlocked as indicated in a block 109. STM library 14 ends the transaction as indicated in a block 110.

STM system 10 may use locks or other suitable synchronization techniques on GVs 51 to ensure that transactions 20 make progress in the case of high contention in STM system 10. If a transaction 20 fails to commit after a number of re-executions, STM system 10 may lock each GV 51 where contention was detected by the transaction 20 to allow the transaction 20 to execute to completion and commit. STM system 10 releases the locks on GVs 51 when the transaction 20 completes. Using the locks, STM system 10 prevents other transactions 20 on threads 60 with affinities 62 to a locked GV 51 from entering the bodies of the transactions 20.

For example, STM system 10 may lock GVs 51(1) and 51(2) where a transaction 20 detected contention with objects 30 that had indices that identified GVs 51(1) and 51(2). While GVs 51(1) and 51(2) are locked, any transactions 20 on threads 60 with affinities 62 to GVs 51(1) and 51(2) are prevented from executing. STM system 10 releases the locks on GVs 51(1) and 51(2) where the transaction 20 commits and allows any transactions 20 on threads 60 with affinities 62 to GVs 51(1) and 51(2) to execute.

The above embodiments with multiple GVs 51 may provide an STM system 10 with better scalability that an STM system with a single GV 51. Such as system may reduce scalability bottlenecks that may occur when numerous transactions 20 access a single GV 51 for read and/or write versions. In particular, cache line contention for accesses to multiple GVs 51 by numerous small transactions 20 may be substantially less than cache line contention for accesses to a single GV 51 by numerous small transactions 20. In addition, the adaptive changing of affinities 62 of threads 60 when conflicts are detected may provide parallelism preservation together with fast conflict detection.

Figure 5:
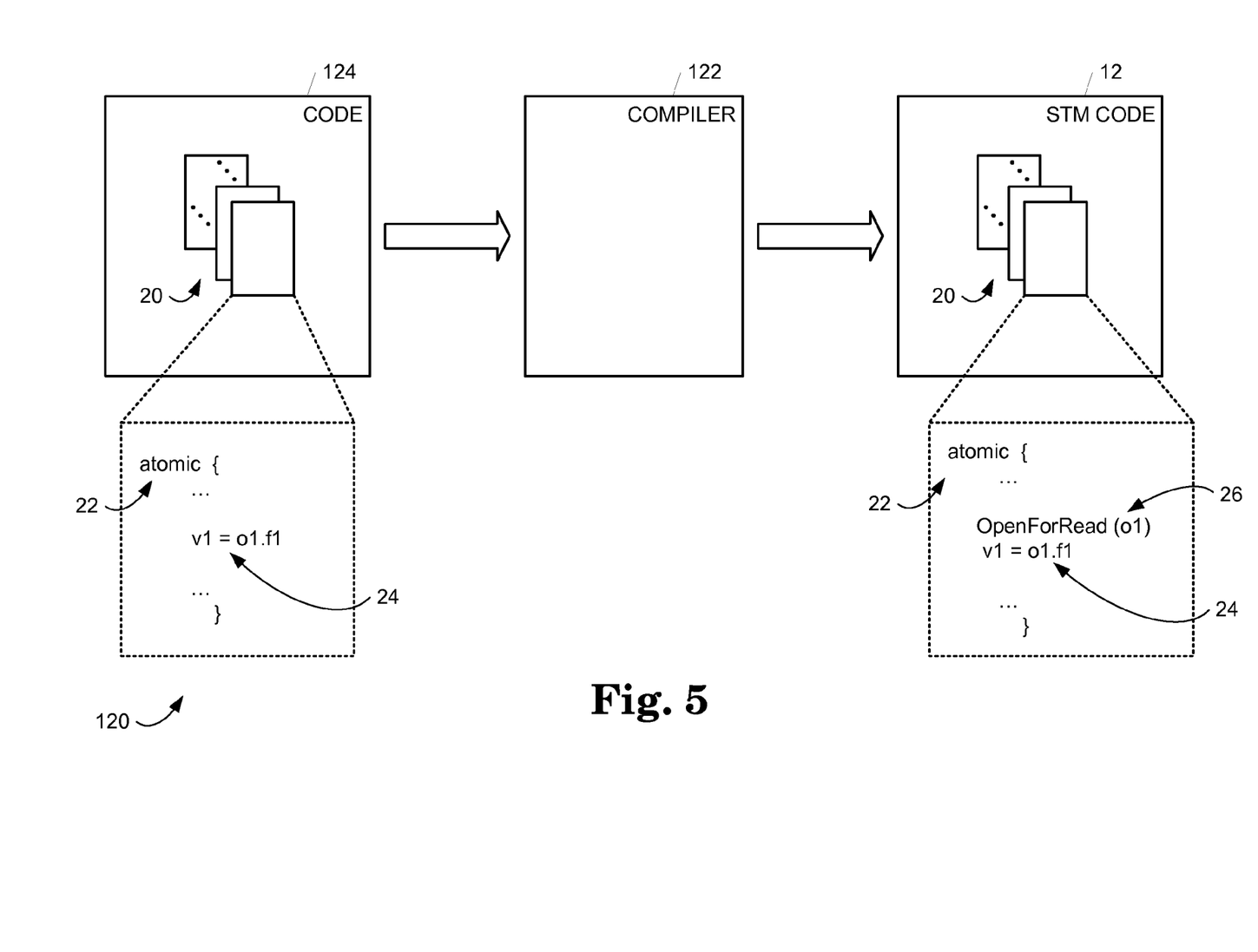
FIG. 5 is a block diagram illustrating an embodiment of a compiler system with a compiler that is configured to compile source code with software transactional memory transactions.

FIG. 5 is a block diagram illustrating an embodiment of a compiler system 120 with a compiler 122 that is configured to compile source code 124 with STM transactions 20.

Compiler system 120 represents a compile mode of operation in a computer system, such as computer system 200 shown in FIG. 6 and described in additional detail below, where the computer system is executing instructions to compile code 124 into STM code 12. In one embodiment, compiler system 120 includes a just-in-time (JIT) compiler system that operates in the computer system in conjunction with a runtime environment executed by an operating system (OS), such as OS 222 shown in FIG. 6 and described in additional detail below, STM library 14, and any additional runtime libraries (not shown). In another embodiment, compiler system 120 includes a stand-alone compiler system that produces STM code 12 for execution on the same or a different computer system.

Code 124 includes a set of one or more STM transactions 20. Each STM transaction 20 includes an atomic block designator 22 that indicates to compiler 122 that a corresponding portion of code 124 is an STM transaction 20. Each STM transaction 20 may include zero or more memory accesses 24 that read from and/or write to an object 30. Code 124 may be any suitable source code written in a language such as Java or C# or any suitable bytecode such as Common Intermediate Language (CIL), Microsoft Intermediate Language (MSIL), or Java bytecode.

Compiler 122 accesses or otherwise receives code 124 with transactions 20 that include memory accesses 24. Compiler 122 identifies memory accesses 24 and compiles code 124 into STM code 12 with invocations 26 of STM array object primitives in STM library 14 for each memory access 24. Compiler 122 performs any desired conversion of the set of instructions of code 124 into a set of instructions that are executable by a designated computer system and includes the set of instructions in STM code 12.

Figure 6:
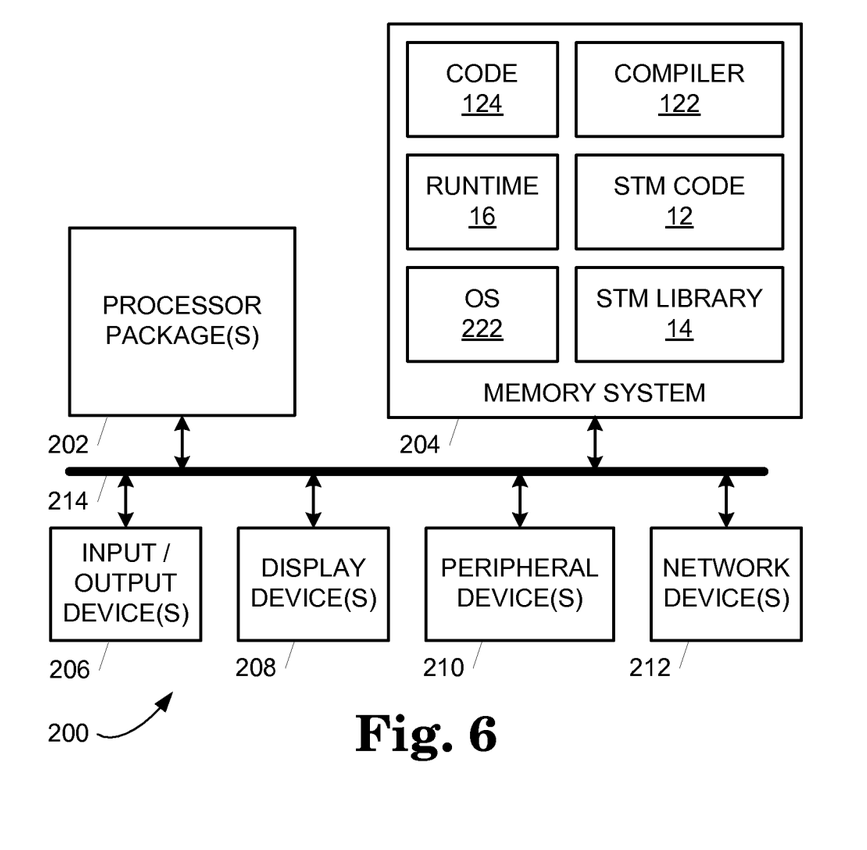
FIG. 6 is a block diagram illustrating an embodiment of a computer system configured to implement a software transactional memory system.

FIG. 6 is a block diagram illustrating an embodiment of a computer system 200 configured to implement STM system 10.

Computer system 200 includes one or more processor packages 202, memory system 204, zero or more input/output devices 206, zero or more display devices 208, zero or more peripheral devices 210, and zero or more network devices 212. Processor packages 202, memory system 204, input/output devices 206, display devices 208, peripheral devices 210, and network devices 212 communicate using a set of interconnections 214 that includes any suitable type, number, and configuration of controllers, buses, interfaces, and/or other wired or wireless connections.

Computer system 200 represents any suitable processing device configured for a general purpose or a specific purpose. Examples of computer system 200 include a server, a personal computer, a laptop computer, a tablet computer, a personal digital assistant (PDA), a mobile telephone, and an audio/video device. The components of computer system 200 (i.e., processor packages 202, memory system 204, input/output devices 206, display devices 208, peripheral devices 210, network devices 212, and interconnections 214) may be contained in a common housing (not shown) or in any suitable number of separate housings (not shown).

Processor packages 202 each include one or more execution cores. Each execution core is configured to access and execute instructions stored in memory system 204. The instructions may include a basic input output system (BIOS) or firmware (not shown), OS 222, STM code 12, STM library 14, runtime environment 16, compiler 122, and code 124. Each execution core may execute the instructions in conjunction with or in response to information received from input/output devices 206, display devices 208, peripheral devices 210, and/or network devices 212.

Computer system 200 boots and executes OS 222. OS 222 includes instructions executable by execution cores to manage the components of computer system 200 and provide a set of functions that allow programs to access and use the components. OS 222 executes runtime environment 16 to allow STM code 12 and STM library 14 to be executed. In one embodiment, OS 222 is the Windows operating system. In other embodiments, OS 222 is another operating system suitable for use with computer system 200.

Computer system 200 executes compiler 122 to generate STM code 12 from code 124. Compiler 122 accesses or otherwise receives code 124 and transforms code 124 into STM code 12 for execution by computer system 200. Compiler 122 performs any desired conversion of the set of instructions of code 124 into a set of instructions that are executable by computer system 200 and includes the set of instructions in STM code 12. Compiler 122 also identifies blocks 20 in code 124 from transaction designators 22 and modifies blocks 20 in STM code 12 to include invocations of STM primitives 26.

In one embodiment, compiler 122 includes a just-in-time (JIT) compiler that operates in computer system 200 in conjunction with OS 222, runtime environment 16, and STM library 14. In another embodiment, compiler 122 includes a stand-alone compiler that produces STM code 12 for execution on computer system 200 or another computer system (not shown).

Computer system 200 executes runtime environment 16 and STM library 14 to allow STM code 12, and transactions 20 therein, to be executed in computer system 200 as described above.

Memory system 204 includes any suitable type, number, and configuration of volatile or non-volatile storage devices configured to store instructions and data. The storage devices of memory system 204 represent computer readable storage media that store computer-executable instructions including STM code 12, STM library 14, runtime environment 16, OS 222, compiler 122, and code 124. The instructions are executable by computer system 200 to perform the functions and methods of STM code 12, STM library 14, runtime environment 16, OS 222, compiler 122, and code 124 as described herein. Memory system 204 stores instructions and data received from processor packages 202, input/output devices 206, display devices 208, peripheral devices 210, and network devices 212. Memory system 204 provides stored instructions and data to processor packages 202, input/output devices 206, display devices 208, peripheral devices 210, and network devices 212. Examples of storage devices in memory system 204 include hard disk drives, random access memory (RAM), read only memory (ROM), flash memory drives and cards, and magnetic and optical disks.

Input/output devices 206 include any suitable type, number, and configuration of input/output devices configured to input instructions or data from a user to computer system 200 and output instructions or data from computer system 200 to the user. Examples of input/output devices 206 include a keyboard, a mouse, a touchpad, a touchscreen, buttons, dials, knobs, and switches.

Display devices 208 include any suitable type, number, and configuration of display devices configured to output textual and/or graphical information to a user of computer system 200. Examples of display devices 208 include a monitor, a display screen, and a projector.

Peripheral devices 210 include any suitable type, number, and configuration of peripheral devices configured to operate with one or more other components in computer system 200 to perform general or specific processing functions.

Network devices 212 include any suitable type, number, and configuration of network devices configured to allow computer system 200 to communicate across one or more networks (not shown). Network devices 212 may operate according to any suitable networking protocol and/or configuration to allow information to be transmitted by computer system 200 to a network or received by computer system 200 from a network.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a software transactional memory (STM) system in a computer system, the method comprising:

executing a first transaction with a first thread, the first thread having a first affinity to a first one of a plurality of global version counters, each global version counter provides a corresponding global version number to transactions executed by affinitized threads, each affinitized thread is affinitized to one of the plurality of global version counters, each global version counter represents a time-stamp of a corresponding transaction that was most recently completed by an affinitized thread;

storing a first copy of the first one of the plurality of global version counters as a first read version prior to performing a first set of read accesses with the first transaction; and validating the first set of read accesses with the first read version.

2. The method of claim 1 further comprising:

detecting that a conflict occurred with the first transaction; and updating a local copy of each of the plurality of global version counters for the first thread in response to detecting the conflict.

3. The method of claim 2 further comprising:

detecting that the conflict corresponds to a memory location with a version number corresponding to the first one of the plurality of global version counters; and changing the first affinity of the first thread from the first one of the plurality of global version counters to a second one of the plurality of global version counters in response to detecting the conflict.

4. The method of claim 1 further comprising:

detecting that a local copy of each of the plurality of global version counters in the first thread has not be updated for a period prior to executing the first transaction; and updating the local copy of each of the plurality of global version counters in the first thread prior to executing the first transaction.

5. The method of claim 1 further comprising:

detecting that a second thread has a second affinity to the first one of the plurality of global version counters; and changing the first affinity of the first thread from the first one of the plurality of global version counters to a second one of the plurality of global version counters in response to detecting the second affinity.

6. The method of claim 1 further comprising:
incrementing the first one of the plurality of global version counters;
storing a second copy of the first one of the plurality of global version counters as a first write version subsequent to performing the first set of read accesses with the first transaction; and
storing the first write version as a version number of each memory location modified by the first transaction along with a first index of the first one of the plurality of global version counters.

7. The method of claim 6 further comprising:
storing the first one of the plurality of global version counters as a second read version prior to incrementing the first one of the plurality of global version counters; and
validating the first set of read accesses with the first read version and the second read version.

8. The method of claim 7 further comprising:
tracking a set of the plurality of global version counters that correspond to the set of read accesses; and
updating a local copy of each of the set of plurality of global version counters subsequent to performing the first set of read accesses with the first transaction.

9. The method of claim 6 further comprising:
executing a second transaction with a second thread that is affinitized to a second one of a plurality of global version counters;
storing a first copy of the second one of the plurality of global version counters as a second read version prior to performing a second set of read accesses with the second transaction; and
validating the second set of read accesses with the second read version.

10. The method of claim 9 further comprising:
incrementing the second one of the plurality of global version counters;
storing a second copy of the second one of the plurality of global version counters as a second write version subsequent to performing the second set of read accesses with the second transaction; and
storing the second write version as a version number of each memory location modified by the second transaction along with a second index of the second one of the plurality of global version counters.

11. A method performed by a software transactional memory (STM) system in a computer system, the method comprising:
storing first and second global version counters as first and second local copies, respectively, of a first thread;
validating a first read access of a first transaction of the first thread using the first local copy; and
validating a second read access of the first transaction of the first thread using the second local copy, each of the first and second global version counter provides a corresponding global version number to transactions executed by affinitized threads, each affinitized thread is affinitized to a corresponding global version counter, each global version counter represents a time-stamp of a corresponding transaction that was most recently completed by an affinitized thread.

12. The method of claim 11 further comprising:
updating at least the first local copy prior to performing the first and the second read accesses, the first thread having an affinity to the first global version counter.

13. The method of claim 12 further comprising:
storing the first and the second global version counters as third and fourth local copies, respectively, of the first thread subsequent to performing the first and the second read accesses;
validating the first read access using the first local copy and the third local copy; and
validating the second read access using the second local copy and the fourth local copy.

14. The method of claim 11 further comprising:
incrementing the first global version counter;
storing a third copy of the first global version counter as a write version subsequent to performing the first and the second read accesses; and
storing the write version as a version number of each memory location modified by the first transaction along with an index of the first global version counter.

15. The method of claim 11 further comprising:
storing the first and the second global version counters as third and fourth local copies, respectively, of a second thread;
validating a third read access of a second transaction of the second thread using the third local copy; and
validating a fourth read access of the second transaction of the second thread using the fourth local copy.

16. A computer readable storage device storing computer-executable instructions that, when executed by a computer system, perform a method comprising:
assigning first and second affinities to first and second global version counters, respectively, to first and second threads, respectively, in a software transactional memory (STM) system; and
causing first and second transactions executed by the first and the second threads, respectively, to commit in first and second commit orders, respectively, determined from the first and the second global version counters, respectively, each of the first and second global version counter provides a corresponding global Version number to transactions executed by affinitized threads, each affinitized thread is affinitized to a corresponding global version counter, each global version counter represents a time-stamp of a corresponding transaction that was most recently completed by an affinitized thread.

17. The computer readable storage device of claim 16, the method further comprising:
changing the first affinity of the first thread to the second global version counter in response to detecting a conflict corresponding to a memory location accessed by the first transaction, wherein an index of the memory location identifies the second global version counter.

18. The computer readable storage device of claim 17, the method further comprising:
updating local copies of the first and the second global version counters in the first thread in response to detecting the conflict.

19. The computer readable storage device of claim 16, the method further comprising:
changing the second affinity of the second thread from the first global version counter to the second global version counter in response to detecting that the first affinity of the first thread is assigned to the first global version counter.

20. The computer readable storage device of claim 16, the method further comprising:
    detecting that first and second local copies of the first and the second global version counters in the first thread have not be updated for a period; and
    updating the first and the second local copies of the first and the second global version counters, respectively, in the first thread prior to executing the first transaction.

\* \* \* \* \*